March 3, 1959  T. L. GIESCHI  2,876,161
SHAVE STICK
Filed Aug. 7, 1957
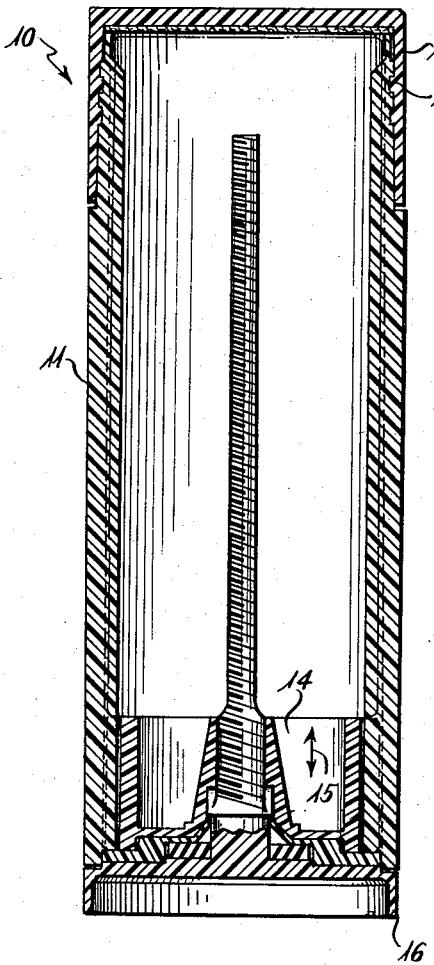
INVENTOR.
Thomas L. Gieschi
BY Saffitz and Gulko
ATTORNEYS

United States Patent Office 2,876,161
Patented Mar. 3, 1959

2,876,161

SHAVE STICK

Thomas L. Gieschi, Springfield, Mass., assignor to Andover Laboratories, a subsidiary of Walbuck Crayon Co., individually owned by Harry Axelrod Application August 7, 1957, Serial No. 676,852

8 Claims. (Cl. 167—85)

The present invention is directed to a brushless shave composition in solid stick form which is to be applied to a water moistened skin area by stroking the stick gently across the area to be shaved to leave behind a thin film which adheres to and softens the skin and beard to prepare the same for shaving with a razor.

The invention provides a solid stick of brushless shave composition which is adapted to be packaged in a suitable container and which can be easily carried in the pocket of the user. The solid stick composition can be applied to the skin without the necessity of employing a brush to prepare a foamed lather and also avoids the necessity of applying a pre-formed foam by hand.

In accordance with the invention, an oil-in-water solid gel is prepared which has dimensional stability in solid form at room temperature. The dispersing water phase of the gel is acidic and contains as the major component a fatty acid which is solid at room temperature and a minor amount of water which is sufficient to dissolve the fatty acid and other components described below which combine with the fatty acid in the non-oily acidic phase.

The acidic water-fatty acid phase into which a liquid oil is incorporated provides a solid form of the composition which serves as the source of a brushless creamy shaving film as long as necessary precautions are taken to prevent evaporation and drying out which removes water from the solid gel.

The non-oily acidic external phase of the oil-in-water gel composition of the invention must include a normal chain fatty acid having at least 12 carbon atoms in the hydrocarbon chain thereof and which is solid at room temperatures, namely at 25° C. Preferably the fatty acid is a saturated acid and has a melting point of from 40° to 85° C. Such fatty acids as lauric acid, myristic acid, palmitic acid, arachidic acid, stearic acid, and behemic acid, or mixtures of these fatty acids may be employed.

Incorporated with the fatty acid in the external fatty acid-water phase of the gel are (1) triethanolamine in amounts of from $\frac{1}{12}$ mol to $\frac{1}{5}$ mol of amine per mol of fatty acid and (2) a liquid, non-toxic, lower alkylene glycol having from 3 to 6 carbon atoms in the molecule which is completely miscible in all proportions with water and which is capable of dissolving mineral oil in an amount of at least about 10%, the amount of said glycol being about 0.3 mol to 0.7 mol per mol of fatty acid.

Alkylene glycols which do not dissolve a sufficient amount of mineral oil but which are substantially miscible with water in all proportions are not satisfactory since liquid rather than solid gel products are formed when these glycols are employed. Thus, glycerol or ethylene glycol which are poor solvents for hydrocarbon oils and mineral oils are incapable of producing a dimensionally stable solid brushless shave preparation which can be packaged and stored.

Further, alkylene glycols which are not miscible in all proportions with water tend to leave the acidic water phase to enter the oil phase and appear to prevent the attainment of the desired water-wetting and water-imbibing properties of the brushless shave film deposited upon a skin area wet with water. Thus the use of higher glycols such as octylene glycol causes the film to feel greasy and slide over wet skin areas and thereby interferes with the cutting operation during shaving.

It is necessary that the alkylene glycol be substantially non-toxic even upon repeated use in contact with the skin. Thus diethylene glycol and dipropylene glycol, although otherwise satisfactory for the requirements of water-miscibility and dissolving power for hydrocarbon mineral oils, are sufficiently toxic in contact with the body to subject the user to a low grade chronic poisoning and are excluded from the invention.

The lower alkylene glycol component, such as propylene glycol, butylene glycol or 2 methyl 2,4 pentanediol which is present in an amount of about 0.3 mol to about 0.7 mol, preferably 0.5 mol of glycol per mol of fatty acid, provides a mineral oil dissolving component in the acidic water phase of the gel.

In the presence of a limited amount of water, about 14% to about 25% by water, based upon the total weight of the oil phase and the acidic water phase which together constitute the entire gel, the above specified glycol component appears to bring a part of the oil into physical combination with the fatty acid-water phase as a solid, this occurring at the interface of the acidic water phase and the oil phase. Thus the glycol appears to absorb onto the fatty acid phase a sufficient amount of dissolved oil to provide a dimensionally stable gel which is solid at room temperature despite the fact that all ingredients other than the fatty acid are liquid at room temperature.

The utilization of this mineral oil-dissolving component, e. g., the non-toxic preferred alkylene glycol, as defined hereinabove, appears to impart a strong water-imbibing characteristic to films deposited upon water wetted areas of the skin and permits an even merging of the water film and brushless shave film into each other under ordinary finger manipulation on the skin. The applied brushless shave film is thereby spread and substantially immediately converted into an easily mobile cream on the face due to the water which is worked into it by finger or hand manipulation. By patting additional quantities of water onto the film it is easy to cover the beard area desired with practically no waste of the shave composition and the film has little tendency to dry out on the face during the normal shaving interval.

Triethanolamine in the amount of $\frac{1}{12}$ to $\frac{1}{5}$ mol, preferably $\frac{1}{10}$ to $\frac{1}{8}$ mol, reacts with the fatty acid during the mixing of the ingredients to form in the acidic water phase of the gel the triethanolamine salt in the presence of a large excess of free fatty acid.

Preferably a refined mineral oil is employed as the hydrocarbon oil component and the amount of mineral oil is at least about $\frac{1}{5}$ by weight of the fatty acid employed.

The amount of anhydrous lanolin which is added to the oil phase may be varied in order to provide desirable variations in the emollient characteristics in the solid composition. It is desirable to add an amount of at least about 10% by weight of the acid and particularly good results are obtained when the amount of lanolin added is about $\frac{1}{5}$ to about $\frac{1}{4}$ of the fatty acid, for example, stearic acid, which is present. This amounts in preferred formulations to about equal parts by weight of lanolin and mineral oil.

Further improvement in the dimensional stability of the solid gel is observed when an organic buffering agent is added to the acidic water phase of the gel. Borax is an example of a suitable buffering agent which can be added. The borax is believed to enter into a salt-forming reaction, in situ, with the fatty acid in the aqueous acid phase. On the basis of reacting molar quantities, it appears that about $\frac{1}{10}$ to about $\frac{1}{5}$ mol parts of borax may react with the fatty acid per mol of fatty acid and that there results improved dimensional stability of the solid in the shaving composition which is produced.

It is essential in accordance with the invention that the water phase of the solid gel which is formed be acidic and that this acidity be derived from the carboxyl acidity of a fatty acid which is normally solid at room temperature.

It appears that, if the composition is completely neutralized with salt forming ingredients such as triethanolamine or borax, that a composition is produced which is not stable either as a liquid emulsion or as a solid gel and which is thereby not capable of producing a solid shave stick of the brushless type in accordance with the invention.

At the point of alkalinity the aqueous phase appears to contain such large amounts of salts of the fatty acid so as to produce in the product grainy precipitated particles. These particles separate and the liquid or gel phase undergoes syneresis upon standing to expel quantities of water as well as droplets of oil. This results in a wholly unsatisfactory product.

It is of interest to compare the tendency of the composition of the present invention to absorb moisture which has been spread upon the surface of the skin or beard with the behaviour of cream preparations which do not require substantial amounts of moisture in order to facilitate their application for preparation to shaving the skin. The solid brushless shaving composition of the present invention is employed in those situations where the skin area is wet with water immediately before or after applying the composition. This water has a tendency to work into the composition even if the amount of composition which has been applied by stroking from the shave stick is very small. Surprisingly more than one shaving operation with the razor may often be had by rewetting the face after going over the skin once. The composition appears to adhere to the wetted areas of the skin and to leave a film which can be remoistened by rewetting the face to permit a second shave operation.

Accordingly, this capability of rewetting the face to permit reshaving an area which has already been shaved appears to be an advantage of the brushless solid stick formulation of the present invention which is not the case with the usual liquid brushless cream composition.

It is therefore seen that the present invention is distinctively different from prior cosmetic and shaving preparations in utilizing a normally solid fatty acid as the principal colloidal binder for the aqueous phase of the gel. Utilization of this fatty acid provides the above indicated unique advantages of water absorption by the application to the skin or beard of the user and provides a film free from foam which facilitates the cutting operation of the razor while not suffering the disadvantages of prior brushless compositions which are greasy or sticky.

In general, the prior art indicates that shave stick preparations have hitherto been formulated utilizing organic colloidal binders such as gelatin, gum tragacanth, gum acacia, gum karaya, methyl cellulose, quinch seed, rosin, and Irish moss. Occasionally lanolin dissolved in ether is added. These binders are either carbohydrates or proteins and are unsuitable in the formulation of the present case because they are sticky whereas the present formulation needs to be substantially non-sticky.

Other stick formulations for shave creams have employed fatty acids with triethanolamine in an amount sufficient to completely react with the carboxyl group of the fatty acid. An example of this type of material which is used for a shampoo rather than a shave formulation is taken from Schimmel Briefs, No. 160, July 1948:

"A gel . . . may be prepared as follows: combine oleic acid (37%) with coconut fatty acids (27%) and triethanolamine (36%) to form mixture A; then combine mixture A (25%) with Santomerse No. 3 paste (25%) and water (48.5%). Cool slightly and add perfume oil (1.5%)."

The utilization of a neutral or alkaline material as explained hereinabove, when prepared in stick form and in the absence of synthetic detergents, provides a composition which will not exhibit the liquid-imbibing qualities of the present invention in combination with oil and which will not have the desirable solid form in combination with oil. In combination with oil on standing, it tends to expel quantities of water as well as droplets of mineral oil which are incorporated therein. The presence of synthetic detergent material appears to have no effect upon the physical stability of completely neutralized fatty acid gels into which oils are incorporated.

Further advantages of the invention are observed in that the solid stick composition is found to be effective in both hard and soft water and also is effective in cold water as well as in hot water. Thus, the shave stick can be used with comfort under conditions which have hitherto caused difficulties for the user, and has provided the opportunity for shaving without discomfort on camping trips using cold mountain stream water.

In an illustraitve formation in accordance with the invention 50-65% by weight of a saturated fatty acid which is solid at room temperature, stearic acid, is mixed with $\frac{1}{12}$ to $\frac{1}{5}$ mol of triethanolamine per mol of fatty acid with 0.3-0.7 mol propylene glycol and with 14-25% of water. The amount of solids in the water phase of the gel composition is seen to be due exclusively to the stearic acid component. The solution of stearic acid in about half its weight of water, triethanolamine and glycol is formed by warming the mixture of ingredients to about 80° C. To the warm solution there is added the oil component which is about $\frac{3}{8}$ to $\frac{5}{8}$ and preferably about half the weight based upon the fatty acid. The oil component consists essentially of a mixture of refined hydrocarbon mineral oil and anhydrous lanolin, each preferably in equal amounts.

In order to better illustrate the invention, the preparation of other preferred compositions are set forth below:

*Example I*

The following materials in parts by weight are employed:

| | |
|---|---|
| Triple pressed stearic acid | 35 |
| White mineral oil (Prorex 905) | 7.5 |
| Lanolin anhydrous | 6.5 |
| Triethanolamine | 2.2 |
| Borax | 2.2 |
| Water | 15.0 |
| Propylene glycol | 4.0 |

Stearic acid, water, borax, propylene glycol and triethanolamine were mixed and warmed with stirring to 80° C. to form a clear solution.

To the warm solution there was added mineral oil and lanolin. After the oil component comprising the mineral oil and lanolin was thoroughly mixed in, the solution was cast directly into the containers which are shown in Fig. 1 and permitted to cool.

It is also permissible to cast the solution into cylindrical wax lined molding containers to produce cast cylinders of solid shaving composition which are removed from the molding containers. These cylinders can be inserted into containers as illustrated in Fig. 1.

In the foregoing Example I, the proportion of water was altered from 10 to 18 parts and in each instance a clear solution was formed by warming and stirring to 80° C. and after addition of the oil component followed by cooling a dimensionally stable solid stick was produced. When less than 10 parts of water, for example, 6 parts of water was used, a clear solution was not achieved. When more than 18 parts of water, for example, 22 parts of water was used, the product produced after cooling was not a dimensionally stable solid stick.

Example II

The procedure of Example I was repeated except that there was added to the mixture 0.1 part by weight by terpineol and 1.4 parts by weight of D & O Bouquet 40-R 4868-B, these ingredients being addded to impart a desirable odor or aroma to the shave stick preparation.

Example III

The procedure of Example I was followed except that instead of propylene glycol, 5.0 parts of 2-methyl, 2, 4 pentane diol were employed. A satisfactory shaving stick was obtained.

Example IV

The procedure of Example I was followed except that instead of propylene glycol, 5.0 parts of butylene glycol (butane diol 1,4) was employed. A satisfactory shaving stick was obtained.

The invention is illustrated in the accompanying drawing in which the single figure is a cross-section taken through a preferred container which, in the form of the invention which is illustrated is constituted by a cast plastic container having a cap for closing the same to prevent the solid gel composition from drying out and a movable platform for elevating the stick confined within the container above the level of the body thereof to progressively expose the upper portion of the stick for use as needed.

Referring more particularly to the drawing, there is shown a container indicated generically by the numeral 10 and which comprises an open-ended cylindrical body 11, a cap 12 which may be releasably connected to the body 11 in any suitable manner, as for example by the threaded connection 13 which is illustrated, and a platform 14.

The platform 14 is movable in the direction of the longitudinal axis of the body 11 as is indicated by the double-ended arrow 15. The desired movement is represented by a double-ended arrow since it is desired that the platform 14 be elevated to project the stick out of the open end of the body 11 when it is desired to use the stick and to retract the stick into a confined position within the body 11 to preserve the stick between occasions of use.

In the particularly preferred container which is shown in the drawing, the platform 14 is projectable and retractable by rotation of the rotatable bottom closure 16, the specific structural relationship which is employed to effect the interconnection between the bottom closure 16 and the platform 14 being shown in the drawing but being immaterial to the present invention.

It will be understood that the shave stick of the invention may be packaged in many different forms, it being merely desired to confine the stick to prevent its drying out and to expose the stick for use when desired. A further purpose of the container is to provide a handle for the stick.

It will be understood that various changes may be made to modify the solid stick shave compositions which are taught herein. Thus, various additives may be incorporated in the shave composition in small proportion to impart various desirable attributes without altering the essential new coaction which is provided by the invention. For example, polyethylene glycol may be added to the shave compositions of the invention in amounts of from about 1% to about 5% by weight in order to improve the rinsing qualities of the shave composition.

The invention is defined in the claims which follow.

I claim:

1. A shave composition adapted to form a solid stick remaining solid at room temperature comprising an oil in water colloidal gel in which a hydrocarbon mineral oil is the oil phase and the water phase is a water solution containing a non-toxic lower alkylene glycol having from 3 to 6 carbon atoms in the molecule which is miscible in all proportions with water and which dissolves in hydrocarbon mineral oil, a saturated fatty acid having at least 12 carbon atoms in the hydrocarbon chain which is solid at room temperature and triethanolamine in an amount of from about $\frac{1}{12}$ mol to about $\frac{1}{5}$ mol per mol of said solid fatty acid to form a salt with a minor proportion of said solid fatty acid and to contribute acidic solids in the water phase of said gel, said saturated solid fatty acid being present in an amount of from about 50–65% by weight of said gel, said dispersed oil phase being present in a weight ratio of from $\frac{3}{8}$ to $\frac{5}{8}$ based upon the weight of said solid fatty acid, said water solution containing from about 14 to about 25% of water based on the weight of said gel, and said alkylene glycol being present in an amount of from about 0.5 to about 0.7 mol per mol of said fatty acid contributing to dimensional solid of said water phase with solid fatty acid and said triethanolamine therein.

2. A shave composition as recited in claim 1 in which said alkylene glycol is propylene glycol.

3. A shave composition as recited in claim 1 in which said alkylene glycol is butylene glycol.

4. A shave composition as recited in claim 1 in which said alkylene glycol is 2-methyl-2,4-pentane diol.

5. A shave composition as recited in claim 1 wherein said saturated solid fatty acid is stearic acid.

6. A shave composition as recited in claim 1 in which said oil phase comprises a mixture of mineral oil and lanolin as an emollient.

7. A shave composition as recited in claim 1 in which said aqueous acid phase is buffered with from about $\frac{1}{10}$–$\frac{1}{5}$ mol parts of borax per mol of said fatty acid.

8. A shave composition as recited in claim 7 wherein said mixture contains equal parts of lanolin and mineral oil.

References Cited in the file of this patent

UNITED STATES PATENTS

| Number | Name | Date |
| --- | --- | --- |
| 1,320,855 | Henderson | Nov. 4, 1919 |
| 1,356,408 | Siller | Oct. 19, 1920 |
| 2,129,836 | Goodman | Sept. 13, 1938 |
| 2,148,286 | White | Feb. 21, 1939 |
| 2,292,419 | Wetherbee | Aug. 11, 1942 |
| 2,366,759 | Thomas | Jan. 9, 1945 |
| 2,457,342 | Braselton | Dec. 28, 1948 |
| 2,628,624 | De Mario | Feb. 17, 1953 |

OTHER REFERENCES

Thomssen: Drug and Cos. Ind., 56:2 February 1945, pp. 174, 175, 264, 265.

Soap and Sanitary Chem., November 1951, pp. 38–41.

Spalton: Pharmaceutical Emulsions, The Chemist and Druggist, London, 1950, pp. 47, 48.